US010250411B2

(12) United States Patent
Yang et al.

(10) Patent No.: US 10,250,411 B2
(45) Date of Patent: Apr. 2, 2019

(54) MESSAGE PROCESSING METHOD AND APPARATUS

(71) Applicant: Huawei Technologies Co., Ltd., Shenzhen (CN)

(72) Inventors: Sulin Yang, Shenzhen (CN); Lehong Niu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/783,918

(22) Filed: Oct. 13, 2017

(65) Prior Publication Data

US 2018/0041364 A1 Feb. 8, 2018

Related U.S. Application Data

(63) Continuation of application No. 12/106,774, filed on Apr. 21, 2008, now Pat. No. 9,794,086, which is a
(Continued)

(30) Foreign Application Priority Data

Apr. 29, 2006 (CN) .......................... 2006 1 0060583
Aug. 21, 2006 (CN) .......................... 2006 1 0125930

(51) Int. Cl.
*H04L 12/28* (2006.01)
*H04L 12/46* (2006.01)
*H04Q 11/00* (2006.01)

(52) U.S. Cl.
CPC ..... *H04L 12/4666* (2013.01); *H04Q 11/0067* (2013.01); *H04Q 2011/0088* (2013.01)

(58) Field of Classification Search
None
See application file for complete search history.

(56) References Cited

U.S. PATENT DOCUMENTS 6,934,286 B2 8/2005 Hwa et al.
7,245,621 B2 7/2007 Sala et al.
(Continued)

FOREIGN PATENT DOCUMENTS

CN 1333613 A 1/2002
CN 1356806 A 7/2002
(Continued)

OTHER PUBLICATIONS

IEEE P802.1ad/D5.1 Draft Standard for Local and Metropolitan Area Networks—Virtual Bridged Local Area Networks (Year: 2005).*
(Continued)

*Primary Examiner* — Noel R Beharry
*Assistant Examiner* — Lionel Preval
(74) *Attorney, Agent, or Firm* — Leydig, Voit & Mayer, Ltd.

(57) ABSTRACT

An optical network termination (ONT) receives an uplink message, the ONT includes a virtual local area network (VLAN) tagging operation configuration data managed entity (ME) with a VLAN tagging operation table, and each entry of the VLAN tagging operation table includes a group of operation value fields and a group of filter value fields including an outer layer VLAN priority filter value, an outer layer VID filter value, an inner layer VLAN priority filter value and an inner layer VID filter value. The ONT filters the received uplink message according to a characteristic value of the received uplink message by using at least one of the above values in a corresponding entry of the VLAN tagging operation table. The ONT performs a VLAN tagging operation for the filtered o uplink message.

14 Claims, 7 Drawing Sheets

Related U.S. Application Data continuation of application No. PCT/CN2007/001307, filed on Apr. 20, 2007.

(56) References Cited

U.S. PATENT DOCUMENTS

| | | | |
|---|---|---|---|
| 7,349,394 | B2 | 3/2008 | Sala et al. |
| 7,411,980 | B2 | 8/2008 | Sala et al. |
| 2002/0003801 | A1 | 1/2002 | Hwa et al. |
| 2002/0131411 | A1 | 9/2002 | Bhatia |
| 2002/0146026 | A1* | 10/2002 | Unitt ................. H04L 12/1886 370/428 |
| 2003/0123453 | A1 | 7/2003 | Ooghe et al. |
| 2003/0137982 | A1 | 7/2003 | Sala et al. |
| 2003/0152389 | A1* | 8/2003 | Sala ................. H04Q 11/0067 398/98 |
| 2003/0172188 | A1 | 9/2003 | Hasegawa et al. |
| 2004/0109450 | A1 | 6/2004 | Kang et al. |
| 2004/0120315 | A1 | 6/2004 | Han et al. |
| 2005/0013306 | A1 | 1/2005 | Albrecht |
| 2005/0058118 | A1 | 3/2005 | Davis et al. |
| 2005/0138149 | A1 | 6/2005 | Bhatia |
| 2005/0190773 | A1* | 9/2005 | Yang ................. H04L 12/4645 370/395.53 |
| 2005/0249498 | A1 | 11/2005 | Haran et al. |
| 2006/0039390 | A1 | 2/2006 | Boyd et al. |
| 2006/0067691 | A1 | 3/2006 | Hirano et al. |
| 2007/0109974 | A1 | 5/2007 | Cutillo et al. |
| 2007/0110028 | A1 | 5/2007 | Wu |
| 2007/0201872 | A1 | 8/2007 | Yim et al. |
| 2007/0211763 | A1* | 9/2007 | Solomon ................. H04L 12/18 370/498 |
| 2007/0274321 | A1 | 11/2007 | Jonsson et al. |
| 2007/0274718 | A1 | 11/2007 | Bridges et al. |
| 2009/0047018 | A1 | 2/2009 | Boyd et al. |
| 2009/0252494 | A1 | 10/2009 | Capurso et al. |

FOREIGN PATENT DOCUMENTS

| | | |
|---|---|---|
| CN | 1371202 A | 9/2002 |
| CN | 1411213 A | 4/2003 |
| CN | 1424833 A | 6/2003 |
| CN | 1441573 A | 9/2003 |
| CN | 1492634 A | 4/2004 |
| CN | 1601980 A | 3/2005 |
| CN | 1691630 A | 11/2005 |
| CN | 1697448 A | 11/2005 |
| CN | 101064682 B | 8/2010 |
| CN | 101313533 B | 8/2011 |
| EP | 1244254 A2 | 9/2002 |
| WO | 03052946 A2 | 6/2003 |
| WO | 2005091556 A2 | 9/2005 |

OTHER PUBLICATIONS

IEEE P802.1ad/D6.0 Draft Standard for Local and Metropolitan Area Networks—Virtual Bridged Local Area Networks (Year: 2005).*
IEEE P802.1Q section 9 (Year: 2005).*
IEEE P802.1ad section 9 (Year: 2005).*
Sulin et al.,"Proposal of VLAN configuration and management in G.984.4," Study Group 15, Working Party: 1, Piscataway, New Jersey, USA, Working Document PU15, XP17528437, International Telecommunication Union, Geneva, Switzerland (May 2006).
"Series G: Transmission Systems and Media, Digital Systems and Networks; Digital sections and digital line system—Optical line systems for local and access networks; Gigabit-capable Passive Optical Networks (G-PON): ONT management and control interface specification," ITU-T Recommendation G.984.4, p. 1-105, International Telecommunication Union, Geneva, Switzerland (Jun. 2004).
"Proposal of VLAN configuration and management in G.983.2 (R2)," Study Group 15, Working Party: 1, Petaluma, California, USA, Working Document PC03 D, XP17528457, International Telecommunication Union, Geneva, Switzerland (Sep. 8, 2006).
"Series G: Transmission Systems and Media, Digital Systems and Networks; Digital sections and digital line system—Optical line systems for local and access networks; B-PON OMCI support for IP, ISDN, video, VLAN tagging, VC cross-connections and other select functions," ITU-T Recommendation G.983.8, p. 1-57, International Telecommunication Union, Geneva, Switzerland (Mar. 2003).
Lehong et al.,"Proposal of GPON in support of 802.1ad," Telecommunication Standardization Sector Study Period 2005-2008, COM 15-D578-E (WP1/15), XP017407693, pp. 1-3, International Telecommunications Union, Geneva, Switzerland (Feb. 6-17, 2006).
"Series G: Transmission Systems and Media, Digital Systems and Networks, Digital sections and Digital line system—Optical line systems for local and access networks; ONT management and control interface specification for B-PON," ITU-T Rec. G.983.2, International Telecommunication Union, Geneva, Switzerland (Jul. 2005).
"Series G: Transmission Systems and Media, Digital Systems and Networks, Digital sections and digital line system—Optical line systems for local and access networks, Gigabit-capable Passive Optical Networks (G-PON): Transmission convergence layer specification," ITU-T Recommendation G.984.3, International Telecommunication Union, Geneva, Switzerland (Feb. 2004).
"IEEE Standards for Local and Metropolitan Area Networks: Virtual Bridged Local Area Networks," IEEE Computer Society, IEEE Std 802.1Q-1998, pp. 1-199, Institute of Electrical and Electronics Engineers, New York, New York (Approved Dec. 8, 1998).
Cohen et al.,"DSL Forum TR-101; Migration to Ethernet-Based DSL Aggregation," Architecture and Transport Working Group, pp. 1-101, Digital Subscriber Line Forum, California, USA (Apr. 2006).
Fenner, "Internet Group Management Protocol, Version 2," Network Working Group, Request for Comments 2236, Updates: 1112, Category: Standards Track, RFC2236, pp. 1-24, The Internet Society (Nov. 1997).

* cited by examiner

MESSAGE PROCESSING METHOD AND APPARATUS

CROSS-REFERENCE TO RELATED APPLICATIONS

This application is a continuation of U.S. patent application Ser. No. 12/106,774, filed Apr. 21, 2008, which is a continuation of International Patent Application No. PCT/CN2007/001307, filed Apr. 20, 2007, which claims priority to Chinese Patent Application No. 200610060583.2, filed Apr. 29, 2006, and Chinese Patent Application No. 200610125930.5, filed Aug. 21, 2006, all of which are hereby incorporated by reference in their entireties.

FIELD

The present disclosure relates to Passive Optical Network (PON) field, particularly to an Optical Network Termination (ONT) in a PON system, a message processing method thereof, a Virtual Local Area Network (VLAN) Tag processing apparatus, and a PON system.

BACKGROUND

Presently, the broadband access techniques mainly include copper cable access techniques (e.g., various DSL techniques) and optical access techniques. Access networks implemented with optical access techniques are referred to as Optical Access Networks (OANs).

PON technique is a point-to-multi-point optical access technique. FIG. 1 is a schematic diagram of the PON system. The PON system includes Optical Line Terminals (OLT), Optical Distribute Network (ODN), and Optical Network Units (ONUs); wherein, OLT provides a Service Node Interface (SNI) for OAN to connect one or more ODNs; ODN transmits downlink data from OLT to each ONU through optical paths; similarly, ODN transmits the uplink data from ONUs to OLT by convergence; ONU provides an User Network Interface (UNI) for OAN and is connected to ODN; if ONU also provides user port function (e.g., Ethernet user port or Plain Old Telephone Service (POTS) user port), it is referred to as an Optical Network Termination (ONT). Unless otherwise specified, hereunder ONU and ONT are referred to as ONT collectively.

In relevant BPON and GPON standards, the model of ONT configuration and management by OLT is defined. OLT manages ONTs via the ONU Management and Control Interface (OMCI) channel. OMCI is the master/slave management protocol, in which the OLT is the master device and ONT is the slave device; OLT controls multiple ONT connected thereunder through the OMCI channel. In a local area network (LAN), sometimes it is necessary to isolate the traffic between users, and to restrict the size of broadcast domain; these functions can be implemented through a Virtual Local Area Network (VLAN). Specifically, a VLAN Tag layer can be added to the users' Ethernet messages; Ethernet frames added with VLAN Tag can only be forwarded within the VLAN. The structure of Ethernet frame added with VLAN Tag is shown in FIG. 2.

The value of a Tag Protocol Identifier (TPID) is fixed to 0x8100; the value of Tag Control Information (TCI) is determined in accordance with the strategy for adding VLAN ID to a specified Ethernet port; TCI includes Priority Code Point (CPC, which is VLAN Priority), Canonical Format Indicator (CFI), and VLAN Identifier (VID).

With the PON technique for user access, in order to isolate the traffic between users or between different services of the same user, different VLANs have to be segmented for each user or for different services of the same user. Hereunder we describe how ONT adds the Ethernet message with a VLAN Tag and then transmits the Ethernet message received via the User Network Interface (UNI) to OLT. As shown in FIG. 3, first, the ONT receives an Ethernet message without a VLAN Tag via the UNI; next, the Medium Access Control (MAC) bridge module in the ONT adds a VLAN Tag to the Ethernet message, and then transmits the Ethernet message to the GPON protocol processing module via the internal Ethernet port; finally, the GPON protocol processing module adds necessary GPON protocol header information to the received Ethernet message to create a GPON frame, and then sends the GPON frame to OLT.

Still in the example of GPON, OMCI is a configuration transmission channel defined in GPON protocol. In the GPON protocol, the data of the ONTs managed by OLT are abstracted into a protocol-independent Management Information Base (MIB), the basic information unit of which is Managed Entity (ME). In the BPON/GPON standard, the ME that manages the VLAN Tagging operations at the ONT Ethernet port is defined as follows:

ME: VLAN Tagging Operation Configuration Data.

Data relationship: each instance of ME for the VLAN Tagging operation configuration data corresponds to a physical Ethernet port of ONT, the physical Ethernet port managed by a Physical Path Termination Point Ethernet UNI ME. The attributes of the ME is shown in the following table:

| | |
|---|---|
| ME ID | This attribute provides a unique numbered ID for each instance of the ME; the numbered ID is identical with the numbered ID of Physical Path Termination Point Ethernet UNI ME. (Read only, set during creation) (required) (2 bytes) |
| Uplink VLAN Tagging operation mode | This attribute indicates whether the uplink Ethernet frame has a VLAN Tag.<br>0x00: No VLAN Tagging operation for the uplink Ethernet frame, no matter whether the Ethernet frame carries a VLAN Tag or not;<br>0x01: Add a VLAN Tag to the uplink Ethernet frame; if the Ethernet frame doesn't carry a Tag, add a VLAN Tag in accordance with the "uplink VLAN Tag TCI value"; if the Ethernet frame carries a Tag, modify the data in TCI field carried in the Ethernet frame in accordance with the "uplink VLAN Tag TCI value";<br>0x02: Add a VLAN Tag to the uplink Ethernet frame; if the Ethernet frame carries a Tag, add a second layer of VLAN Tag in accordance with the "uplink VLAN Tag TCI value"; if the Ethernet frame doesn't carry a Tag, add a VLAN Tag layer in accordance with the "uplink VLAN Tag TCI value";<br>(Readable, writeable, set during creation) (required) (1 byte) |

-continued

| | |
|---|---|
| Uplink VLAN Tag TCI value | The value of uplink VLAN Tag TCI; apply the field if the operation mode of uplink VLAN Tag is 0x01 or 0x02.<br>(Readable, writeable, set during creation) (required) (2 bytes) |
| Downlink VLAN Tagging operation mode | The downlink VLAN Tagging operation mode,<br>0x00 indicates no operation.<br>0x01 indicates removing the Tag from the downlink Ethernet frame.<br>(Readable, writeable, set during creation) (mandatory) (1 byte) |

For example, in the GPON standard, if the uplink VLAN Tagging Operation Mode attribute is set to 0x01, ONT will process the received Ethernet message via the Ethernet port at user side in a way shown in FIG. 4. In that mode, ONT will add a preset VLAN Tag layer to the message without a VLAN Tag received via the Ethernet port at user side; the ONT will replace the existing VLAN Tag with a preset VLAN Tag for the message added with a VLAN Tag, so that the Ethernet messages forwarded by the MAC bridge module in uplink direction have a uniform outermost VLAN Tag layer; in other words, all VLAN Tags contained in all uplink Ethernet messages are the same after they are processed by ONT through the VLAN Tagging operation, similar to the "V0" shown in the Figure.

In the GPON standard, if the uplink VLAN Tagging Operation Mode attribute is set to 0x02, ONT will process the received Ethernet message via the Ethernet port at user side in a way shown in FIG. 5. The ONT will add a preset VLAN Tag layer to the message without VLAN Tag received via the Ethernet port at user side; it will add a second VLAN Tag layer to the message added with a VLAN Tag in accordance with the "uplink VLAN Tag TCI value", all Ethernet messages forwarded by the MAC bridge module in the uplink direction have a uniform outermost VLAN Tag layer, i.e., VLAN Tags contained in all uplink Ethernet message are the same after they are processed by the ONT through the VLAN Tagging operation, similar to the "V0" shown in the Figure.

During the process that the present invention is implemented, the inventor has found, existing ONTs can only add a same VLAN Tag to the messages received via the same Ethernet port at user side. Usually, in an optical network, other network devices that are interconnected with the ONT and designed to perform subsequent processing for messages from the ONT will perform subsequent processing in accordance with the VLAN Tag added by the ONT to the messages. Therefore, if the ONT adds the same VLAN Tag to all received messages, the subsequent network devices can only perform the same processing for the messages when the messages from the ONT enter into the subsequent network devices; however, such a simple processing method can't meet diversified demands for processing any more.

SUMMARY

Embodiments of the present invention provide a method and apparatus for message processing.

In one embodiment of the present invention, a method for message processing is provided. An optical network termination (ONT) receives an uplink message, the ONT includes a virtual local area network (VLAN) tagging operation configuration data managed entity (ME) with a VLAN tagging operation table, and each entry of the VLAN tagging operation table includes a group of operation value fields and a group of filter value fields including an outer layer VLAN priority filter value, an outer layer VID filter value, an inner layer VLAN priority filter value and an inner layer VID filter value. The ONT filters the received uplink message according to a characteristic value of the received uplink message by using at least one of the above values in a corresponding entry of the VLAN tagging operation table. The ONT performs a VLAN tagging operation for the filtered o uplink message.

BRIEF DESCRIPTION OF THE DRAWINGS

The accompanying drawings described herein are for further understanding of the present invention, and a part of this application, but not intended to limit the present invention. Among the accompanying drawings.

DETAILED DESCRIPTION OF THE EMBODIMENTS

Figure 1:
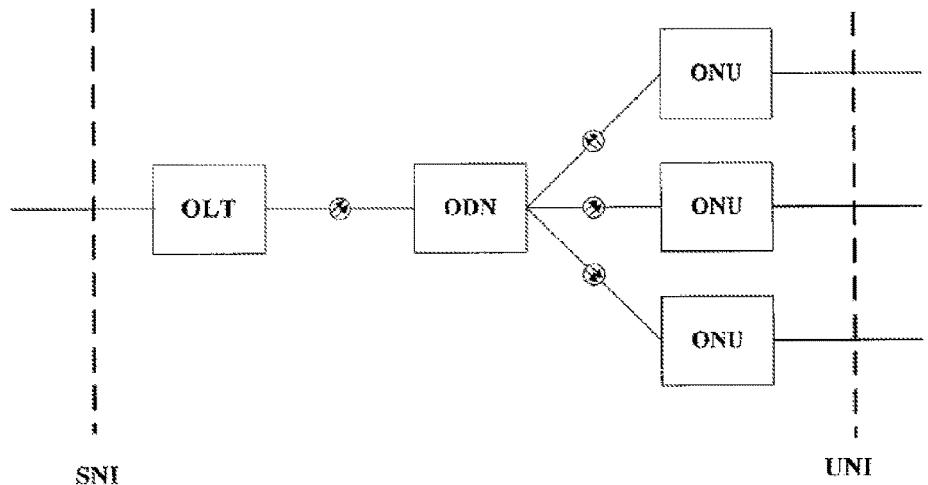
FIG. 1 is a schematic diagram of existing PON system.
Figure 2:
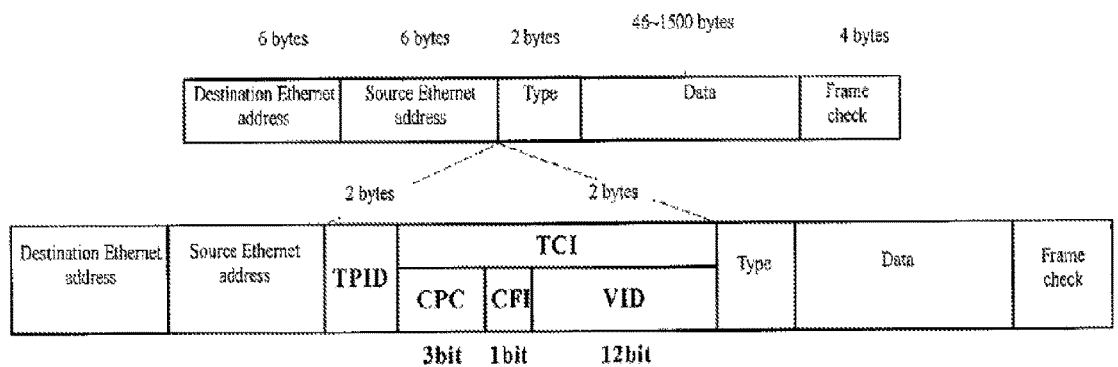
FIG. 2 is a schematic diagram of existing Ethernet frame structure added with VLAN Tag.
Figure 3:
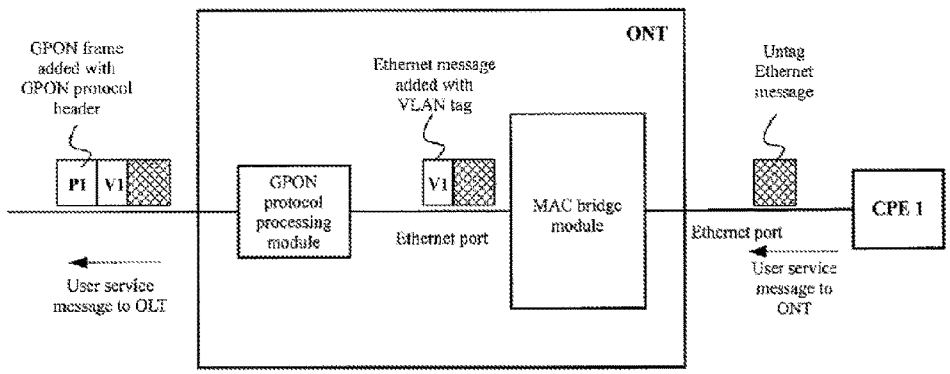
FIG. 3 is a schematic diagram of VLAN Tagging operation of Ethernet message by existing ONT.
Figure 4:
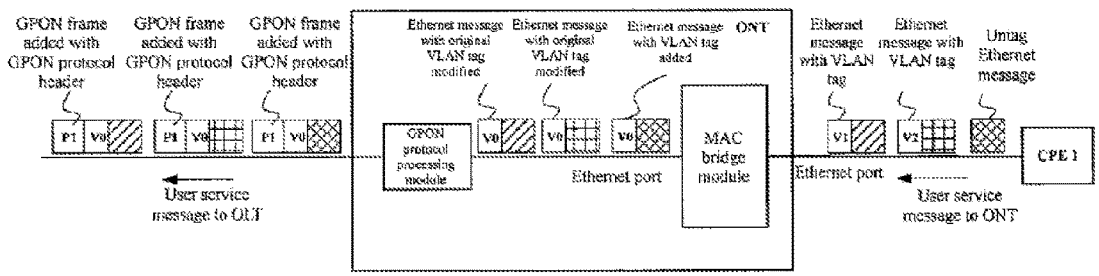
FIG. 4 is a schematic diagram of VLAN Tagging operation of Ethernet message by ONT in a first mode.
Figure 5:
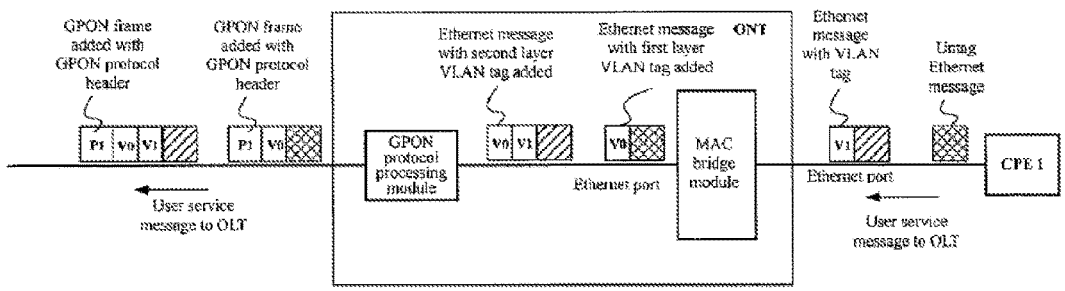
FIG. 5 is a schematic diagram of VLAN Tagging operation of Ethernet message by ONT in a second mode.

In an embodiment of message processing method of ONT in the present invention, the user side network interface function module of ONT performs a VLAN Tagging operation for the message in accordance with the VLAN operation configuration data attribute. The VLAN Tagging operation is any combination of VID operation, VLAN priority operation, and layer-based operation, in other words, it is a VID operation and/or VLAN priority operation on a specified layer. The combination of VLAN Tagging operations includes the following specific operations.

ONT only performs operation for VID of the inner layer VLAN Tag or VLAN priority of the inner layer VLAN Tag, or VID of the outer layer VLAN Tag or VLAN priority of the outer layer VLAN Tag of the uplink message.

ONT only performs operation for the inner layer VLAN Tag or outer layer VLAN Tag of the uplink message.

ONT only performs operation for the VID or VLAN priority of the uplink message.

ONT performs operation for the inner layer VLAN Tag and the outer layer VLAN Tag of the uplink message, respectively.

ONT performs operation for the inner layer VLAN Tag of the uplink message; it also performs operation for the VID and VLAN priority on this layer while it performs operation for the inner layer VLAN Tag of the uplink message.

ONT performs operation for the outer layer VLAN Tag of the uplink message; it also performs operation for the VID and VLAN priority on this layer while it performs operation for the outer layer VLAN Tag of the uplink message; or.

ONT performs operation for the inner layer VLAN Tag and the outer layer VLAN Tag of the uplink message respectively; it also performs operation for the VID and VLAN priority on the corresponding layers while it performs operation for the inner layer VLAN Tag and the outer layer VLAN Tag of the uplink message respectively.

Hereunder the technical scheme of the present invention will be introduced in detail in three embodiments of the present invention.

First, with reference to the technical scheme provided in the first embodiment of this present invention.

The first VLAN Tagging operation configuration data ME defined in the embodiment is described as follows:

ME: VLAN Tagging Operation Configuration Data.

Data relationship: each instance of VLAN Tagging operation configuration data ME corresponds to a physical UNI port of ONT (here, it is the physical Ethernet port). The port is managed by the Physical Path Termination Point Ethernet UNI ME. The attributes of the ME is shown in the following table:

| | |
|---|---|
| ME ID | This attribute provides a unique numbered ID for each instance of the ME; the numbered ID is identical to the numbered ID of Physical Path Termination Point Ethernet UNI ME. (Read only, set during creation) (required) (2 bytes) |
| Uplink VLAN Tagging operation mode | This attribute is used to choose the VLAN Tagging operation mode for the uplink frame. ONT, when receiving an uplink frame, will perform operation for the VID and VLAN priority in the mode selected in this attribute. The first byte indicates the VID operation mode, the higher 4 bits indicate the operation mode for the inner layer VID, while the lower 4 bits indicate the operation mode for the outer layer VID. The second byte indicates the operation mode for VLAN priority, the higher 4 bits indicate the operation mode for the inner layer VLAN priority, while the lower 4 bits indicate the operation mode for the outer layer VLAN priority. The field is: aaaabbbbccccdddd, the meaning of every 4 bits is similar. XXXX (X represents a, b, c, or d) 0000 (0x00): the uplink frame will not be processed regardless of whether there is any VLAN Tag on the layer of the uplink frame. 0001 (0x01): if x = a, an inner layer uplink VLAN Tag VID value will be added to or replace the inner layer VLAN Tag VID; if x = b, an outer layer uplink VLAN Tag VID value will be added to or replace the outer layer VLAN Tag VID; if x = c, the VLAN priority value of inner layer uplink VLAN Tag will be added to or replace the VLAN priority of inner layer VLAN Tag; if x = d, the VLAN priority value of outer layer uplink VLAN Tag will be added to or replace the VLAN priority of outer layer VLAN Tag; 0010 (0x02): it is valid only if x = b or x = d. If x = b, it indicates the outer layer VLAN Tag VID value is a copy of the inner layer VLAN Tag VID value; if x = d, it indicates the outer layer VLAN Tag VLAN priority is a copy of the inner layer VLAN Tag VLAN priority. 0011~1111 (0x03~0x0f): reserved (Readable, writeable, set during creation) (required) (2 bytes) |
| Inner layer uplink VLAN Tag VID value | The uplink VLAN Tag VID value of the inner layer; this field will be applied if the operation mode of the inner layer uplink VLAN Tag is 0x01 or 0x02. (Readable, writeable, set during creation) (required) (2 bytes) |
| Outer layer uplink VLAN Tag VID value | The uplink VLAN Tag VID value of the outer layer; this field will be applied if the operation mode of the outer layer uplink VLAN Tag is 0x01 or 0x02. (Readable, writeable, set during creation) (required) (2 bytes) |
| VLAN priority of inner layer uplink VLAN Tag | The VLAN priority value of inner layer uplink VLAN Tag, the lower 4 bits are valid. If "cccc" = 0x01 in the uplink VLAN Tagging operation mode, the VLAN priority of inner layer VLAN Tag of the uplink message will be replaced with or added with the lower 4 bits of the valued. (Readable, writeable, set during creation) (required) (1 byte) |
| VLAN priority of outer layer uplink VLAN Tag | The VLAN priority value of outer layer uplink VLAN Tag, the lower 4 bits are valid. If "dddd" = 0x01 in the uplink VLAN Tagging operation mode, the VLAN priority of outer layer VLAN Tag of the uplink message will be replaced with or added with the lower 4 bits of the value. (Readable, writeable, set during creation) (required) (1 byte) |

| | |
|---|---|
| Downlink VLAN Tagging operation mode | This attribute is used to choose the VLAN Tagging operation mode for the downlink frame.<br>0x00: keep unchanged, i.e., the downlink frame will be transmitted transparently, no matter what the downlink frame is.<br>0x01: restore to normal, i.e., process the downlink frame in the reverse direction to the uplink frame VLAN operation mode.<br>(Readable, writeable, set during creation) (required) (1 byte) |

The above table only shows one operational mode of the embodiments in the present invention, i.e., in the VLAN Tagging operation mode, the inner layer VLAN Tag and the outer layer VLAN Tag are processed separately, and the VID and VLAN priority of VLAN Tag on each layer are processed separately; actual implementations are not limited to the scheme provided in above table.

With this scheme, various conventional operations for VLAN Tag can be implemented easily. For example, if the uplink VLAN Tagging operation mode is set to 0x02000200, it indicates Native VLAN operation mode; if the uplink VLAN Tagging operation mode is set to 0x0001001, it indicates VLAN Stacking operation mode; if the uplink VLAN Tagging operation mode is set to 0x00010001, it indicates QinQ operation mode.

Figure 6:
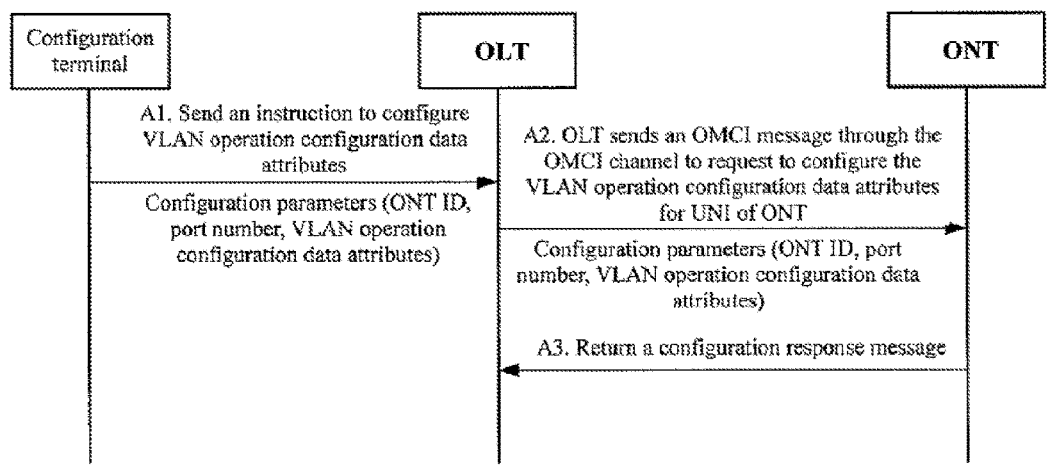
FIG. 6 is a flow diagram that a configuration terminal of the present invention configures a first type of the VLAN operation configuration data attributes for the user network interface of ONT through OLT.

With reference to FIG. 6, in an embodiment of the present invention, a method, with that the configuration terminal configures a first type of the VLAN operation configuration data attributes for the UNI of a ONT via a OLT comprises the following steps:

A1. The configuration terminal sends an instruction to OLT to configure the VLAN operation configuration data attributes; the configuration parameters of the configuration instruction include an ONT ID, port number of a UNI for which the configuration data attribute is to be configured for the VLAN operation, and the configuration data attribute for the VLAN operation (including uplink VLAN Tagging operation mode, inner layer VLAN VID value, outer layer VLAN VID value, VLAN priority of inner layer uplink VLAN Tag, VLAN priority of outer layer uplink VLAN Tag, and downlink VLAN Tagging operation mode).

A2. The OLT sends an OMCI message to the ONT via the OMCI channel, to request configuring the VLAN operation configuration data attributes for the UNI port of the ONT; the configuration parameters in the OMCI message include the ONT ID, port number of the UNI for which the configuration data is to be configured for the VLAN operation, and configuration data attributes for the VLAN operation (including uplink the VLAN Tagging operation mode, the inner layer VLAN VID value, the outer layer VLAN VID value, the VLAN priority of inner layer uplink VLAN Tag, the VLAN priority of outer layer uplink VLAN Tag, and the downlink VLAN Tagging operation mode).

A3. ONT stores the configuration data attributes for the VLAN operation in the VLAN Tagging Operation Configuration Data ME, and returns a configuration response message to OLT.

Besides the above method, the configuration terminal can also send the instruction to ONT directly or by remote control (e.g., via local serial port, or by means of Telnet or network management), to configure the configuration data attributes for the VLAN operation; the ONT stores, in the VLAN Tagging Operation Configuration Data ME, the configuration data attributes for the VLAN operation in the instruction.

Figure 7:
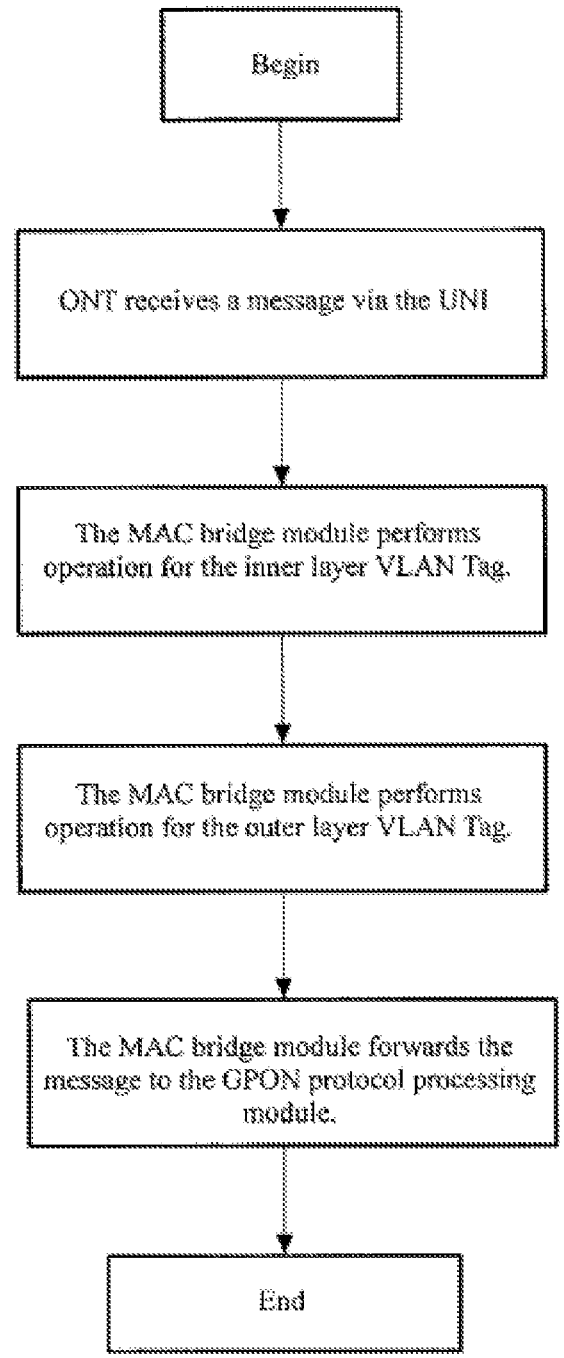
FIG. 7 is a flow diagram of the present invention that the ONT processes the uplink message after the first type of the VLAN operation configuration data attributes are configured for the user network interface.

With reference to FIG. 7, in an embodiment of the present invention, after the first type of the VLAN operation configuration data attributes are configured for the UNI, the ONT processes the uplink message through the following steps:

B1. ONT receives an uplink message via the UNI for which the VLAN operation configuration data attributes are configured;

B2. The MAC bridge module of ONT processes the inner layer VLAN Tag of the uplink message in accordance with the operation mode for the inner layer VID and the VLAN priority in the VLAN operation configuration data attributes, for example, keep unchanged, add the VLAN Tag, or modify the VLAN Tag; please refer to the table of attributes of the first VLAN Tagging Operation Configuration Data ME;

B3. The MAC bridge module of the ONT processes the outer layer VLAN Tag of the uplink message in accordance with the operation mode for the outer layer VID and the VLAN priority in the VLAN operation configuration data attributes, for example, keep unchanged, copy the VID value of the inner layer VLAN Tag to the VID field of the outer layer VLAN Tag and copy the VLAN priority of the inner layer VLAN Tag to the VLAN priority field of the outer layer VLAN Tag, add the VLAN Tag or modify the VLAN Tag; please refer to the table of attributes of the first VLAN Tagging Operation Configuration Data ME.

B4. The MAC bridge module of ONT forwards the uplink message as processed to the GPON protocol processing module of the ONT.

Finally, the GPON protocol processing module of the ONT adds required GPON protocol header information to the message received from the MAC bridge module and then sends the message to OLT.

Figure 8:
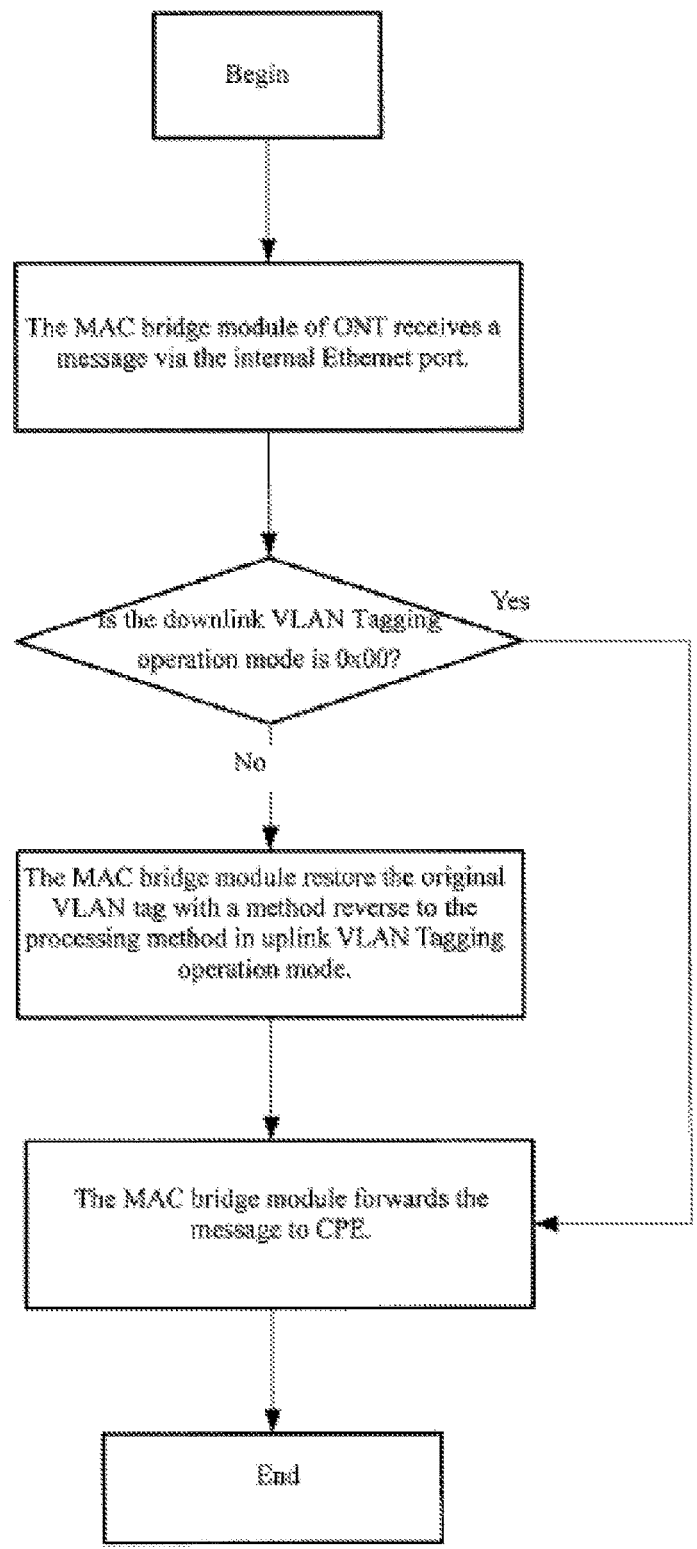
FIG. 8 is a flow diagram of the present invention that the ONT processes a downlink message after the first type of the VLAN operation configuration data attributes are configured for the user network interface.

With reference to FIG. 8, in an embodiment of the present invention, after the first type of the VLAN operation configuration data attributes are configured for the UNI, the ONT processes the downlink message through the following steps:

C1. After the VLAN operation configuration data attributes are configured for the UNI of the ONT, the MAC bridge module receives a downlink message with the VLAN Tag via the internal Ethernet port.

C2. The MAC bridge module of the ONT judges whether the downlink VLAN Tagging operation mode is a transparent transmission mode (0x00); if the downlink VLAN Tagging operation mode is a transparent transmission mode, the MAC bridge module executes step C4 directly; otherwise the MAC bridge module executes step C3.

C3. The MAC bridge module of the ONT processes the downlink message in the reverse direction to the uplink VLAN Tagging operation mode, to restore the original VLAN Tag.

C4. The MAC bridge module of the ONT forwards the message to the user side via the UNI.

The step C3 further includes the following steps:

C31. The UNI module of the ONT processes the outer layer VLAN Tag of the downlink message in the reverse direction to the operation mode for the outer layer VID and the VLAN priority in the VLAN operation configuration data attributes.

C32. The UNI module of the ONT processes the inner layer VLAN Tag of the downlink message in the reverse direction to the operation mode for inner layer VID and the VLAN priority in the VLAN operation configuration data attributes.

For example, in accordance with the operation mode for the outer layer or the inner layer VID and the VLAN priority in the VLAN operation configuration data attributes, if the operation for the outer layer or the inner layer VLAN Tag of the uplink message is "keep unchanged," the operation for the outer layer or inner layer VLAN Tag of the downlink message will also be "keep unchanged."

In accordance with the operation mode for the outer layer or inner layer VID and the VLAN priority in the VLAN operation configuration data attributes, if the operation for the outer layer or inner layer VLAN Tag of the uplink message is "add VLAN Tag," the operation for the outer layer or inner layer VLAN Tag of the downlink message will be "remove VLAN Tag."

In accordance with the operation mode for the outer layer or inner layer VID and VLAN priority in the VLAN operation configuration data attributes, if the operation for the outer layer or inner layer VLAN Tag of the uplink message is: if the layer of the uplink frame carries the VLAN Tag, modify the VID field value carried on the layer in accordance with the value of "uplink VLAN Tag VID" of the layer, and modify the VLAN priority filed value carried on the layer in accordance with the value of "VLAN priority of uplink VLAN Tag" of the layer; then, the operation for the outer layer or inner layer VLAN Tag of the downlink message will be: restore the original VID and VLAN priority field values carried on the layer.

In accordance with the operation mode for the outer layer or inner layer VID and VLAN priority in the VLAN operation configuration data attributes, if the operation for the outer layer or inner layer VLAN Tag of the uplink message is: "if the layer of the uplink frame carries VLAN Tag, do not change the VID and VLAN priority field values carried in the uplink frame on the layer," then, the operation for the outer layer or inner layer VLAN Tag of the downlink message will be: do not change the VID and VLAN priority filed values carried in the downlink frame on the layer.

In accordance with the operation mode for the outer layer or inner layer VID and VLAN priority in the VLAN operation configuration data attributes, if the operation for the outer layer or inner layer VLAN Tag of the uplink message is: copy the VID value of the inner layer VLAN Tag to the VID field of the outer layer VLAN Tag, and copy the VLAN priority of the inner layer VLAN Tag to the VLAN priority field of the outer layer VLAN Tag; then the operation for the downlink frame will be: remove a VLAN Tag layer.

Next, with reference to the technical scheme provided in the second embodiment of the present invention.

For messages with two VLAN Tag layers that are commonly used today, the messages received by the UNI can only be in any of three forms: messages without VLAN Tag (unTag messages), messages with one VLAN Tag layer, or messages with two VLAN Tag layers. After the MAC bridge module of ONT receives a message via the UNI, the MAC bridge module is capable of categorizing the message and identifying the message form (message without VLAN Tag, message with one VLAN Tag layer, or message with two VLAN Tag layers). Then, the MAC bridge module can process each message form in a variety of ways; however, each operation mode is a combination of an inner layer VLAN Tagging operation and an outer layer VLAN Tagging operation. Therefore, three types of message operation modes and VID and VLAN priority values of the inner layer and outer layer VLAN Tags can be defined.

The second VLAN Tagging Operation Configuration Data ME defined with above categorization method is described as follows:

ME: VLAN Tagging Operation Configuration Data.

Data relationship: each instance of ME for VLAN tagging operation configuration data corresponds to a physical Ethernet port of ONT, the Ethernet port managed by a Physical Path Termination Point Ethernet UNI ME. The attributes of the ME is shown in the following table:

| | |
|---|---|
| ME ID | This attribute provides a unique numbered ID for each instance of the ME; the ID is identical to the ID of Physical Path Termination Point Ethernet UNI ME.<br>(Read only, set during creation) (required) (2 bytes) |
| Uplink VLAN Tagging operation mode for UnTag message | 0x00: Keep unchanged<br>0x01: Add a VLAN Tag to the uplink Ethernet frame, i.e., add a VLAN Tag layer in accordance with the "uplink VLAN Tag TCI value" for inner layer.<br>0x02: Add two VLAN Tag layers to the uplink Ethernet frame, i.e., add an inner layer VLAN Tag in accordance with the "uplink VLAN Tag TCI value" for inner layer, and add an outer layer VLAN Tag in accordance with the "uplink VLAN Tag TCI value" for outer layer.<br>(Readable, writeable, set during creation) (required) (1 byte) |
| Uplink VLAN Tagging operation mode for message with one VLAN Tag layer | 0x00: Keep unchanged<br>0x01: Add a VLAN Tag to the uplink Ethernet frame, i.e., modify the VLAN Tag TCI value (i.e., inner layer VLAN Tag) in accordance with the "uplink VLAN Tag TCI value" for inner layer.<br>0x02: Add a VLAN Tag to the uplink Ethernet frame, i.e., add a VLAN Tag layer (i.e., outer layer VLAN Tag) in accordance with the "uplink VLAN Tag TCI value" for outer layer.<br>0x03: Add a VLAN Tag layer to the uplink Ethernet frame; the VLAN Tag TCI value added is a copy of the inner layer VLAN Tag TCI value, i.e., copy the inner layer VLAN Tag to the outer layer.<br>(Readable, writeable, set during creation) (required) (1 byte) |

| | |
|---|---|
| Uplink VLAN Tagging operation mode for message with two VLAN Tag layers | 0x00: Keep unchanged<br>0x01: Add a VLAN Tag layer to the uplink Ethernet frame, i.e., modify the outer layer VLAN Tag TCI value in accordance with the "uplink VLAN Tag TCI value" for outer layer.<br>0x02: Add two VLAN Tag layers to the uplink Ethernet frame, i.e., modify the inner layer VLAN Tag TCI value in accordance with the "uplink VLAN Tag TCI value" for inner layer; and modify the outer layer VLAN Tag TCI value in accordance with the "uplink VLAN Tag TCI value" for outer layer.<br>0x03: Add a VLAN Tag layer to the uplink Ethernet frame, i.e., copy the inner layer VLAN Tag TCI value to the outer layer VLAN Tag TCI.<br>(Readable, writeable, set during creation) (required) (1 byte) |
| Inner layer uplink VLAN Tag TCI value | Uplink VLAN Tag TCI value; if the operation mode for inner layer uplink VLAN Tag is 0x01 or 0x02, apply this field.<br>(Readable, writeable, set during creation) (required) (2 bytes) |
| Outer layer uplink VLAN Tag TCI value | Uplink VLAN Tag TCI value; if the operation mode for outer layer uplink VLAN Tag is 0x01 or 0x02, apply this field.<br>(Readable, writeable, set during creation) (required) (2 bytes) |
| Downlink VLAN Tagging operation mode | This attribute is used to choose the VLAN Tagging operation mode for the downlink frame.<br>0x00: keep unchanged, i.e., the downlink frame will be transmitted transparently, no matter what the downlink frame is.<br>0x01: restore to normal, i.e., process the downlink frame in the reverse direction to the uplink frame VLAN operation mode.<br>(Readable, writeable, set during creation) (required) (1 byte) |

The above table shows an embodiment of the present invention, i.e., in the VLAN Tagging operation mode, the received message is categorized first, and then the inner layer VLAN Tag and outer layer VLAN Tag of each type of message are processed separately, and the VID and VLAN priority of VLAN Tag on each layer are processed separately. However, the actual implementations are not limited to the scheme shown in above table.

With the technical scheme, it is easy to implement existing operations for VLAN Tags; furthermore, different types of messages can be processed in different VLAN Tagging operation modes. Therefore, different uplink messages can have different VLAN Tags after they are processed by the ONT through the VLAN Tagging operation; as a result, the subsequent network devices can process the uplink messages in diverse ways. For example, Ethernet messages received via the UNI can be processed differently: VLAN Stacking operation for UnTag messages, QinQ operation for messages with one VLAN Tag layer, and no processing for messages with two VLAN Tag layers.

In the embodiment of the present invention, the configuration terminal configures the second type of the VLAN operation configuration data attributes for the UNI of a ONT via a OLT in the same way as it configures the first type of the VLAN operation configuration data attributes, with the only difference as: the second type of the VLAN operation configuration data attributes include: uplink VLAN Tagging operation mode for UnTag message, uplink VLAN Tagging operation mode for message with one VLAN Tag layer, uplink VLAN Tagging operation mode for message with two VLAN Tag layers, inner layer uplink VLAN Tag TCI value, outer layer uplink VLAN Tag TCI value, and downlink VLAN Tagging operation mode.

Figure 9:
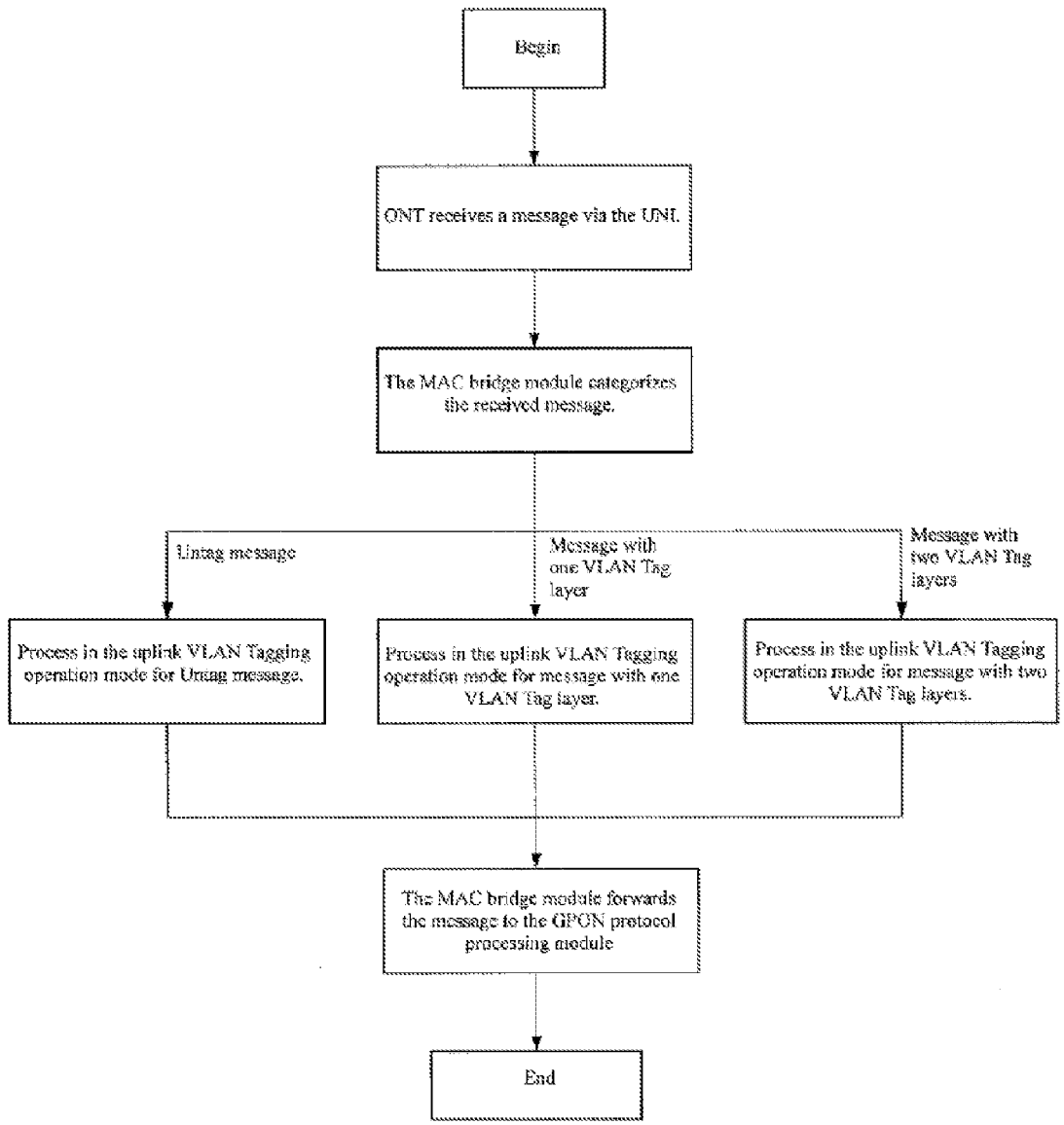
FIG. 9 is a flow diagram of the present invention that the ONT processes a uplink message after a second type of the VLAN operation configuration data attributes are configured for the user network interface.

With reference to FIG. 9, in the embodiment of the present invention, after the first second type of the VLAN operation configuration data attributes are configured for the UNI, the method of a ONT processes the uplink message through the following steps:

D1. ONT receives an uplink message via the UNI for which the VLAN operation configuration data attributes have been configured.

D2. The MAC bridge module of the ONT categorizes the received uplink message into Unlag message, message with one VLAN Tag layer, or message with two VLAN Tag layers; if the message is an UnTag message, the MAC bridge module of the ONT executes step D3; if the message is with one VLAN Tag layer, the module executes step D4; if the message is with two VLAN Tag layers, the module executes step D5.

D3. In accordance with the uplink VLAN Tagging operation mode, inner layer uplink VLAN Tag TCI value and outer layer uplink VLAN Tag TCI value in the VLAN operation configuration data attributes for the UnTag message, the MAC bridge module of ONT processes the UnTag message, i.e., keep unchanged, add a VLAN Tag layer, or add two VLAN Tag layers, etc., see the table of attributes of the second VLAN Tagging Operation Configuration Data ME for details; then, the MAC bridge module of ONT executes step D6 directly.

D4. In accordance with the uplink VLAN Tagging operation mode, the inner layer uplink VLAN Tag TCI value and outer layer uplink VLAN Tag TCI value in the VLAN operation configuration data attributes for the message with one VLAN Tag layer, the MAC bridge module of the ONT processes the message with one VLAN Tag layer, i.e., keep unchanged, modify the VLAN Tag, add outer layer VLAN Tag, modify inner layer VLAN Tag and add outer layer VLAN Tag, etc., see the table of attributes of the second VLAN Tagging Operation Configuration Data ME for details; then, the MAC bridge module of the ONT executes step D6 directly.

D5. In accordance with the uplink VLAN Tagging operation mode, inner layer uplink VLAN Tag TCI value and outer layer uplink VLAN Tag TCI value in the VLAN operation configuration data attributes for the message with two VLAN Tag layers, the MAC bridge module of the ONT processes the Ethernet message with two VLAN Tag layers, i.e., keep unchanged, modify outer layer VLAN Tag, modify inner layer VLAN Tag and outer layer VLAN Tag, etc., details can be referred in the table of attributes of the second VLAN Tagging Operation Configuration Data ME; then, the MAC bridge module of the ONT executes step D6 directly.

D6. The MAC bridge module of the ONT forwards the uplink message to the GPON protocol processing module of ONT.

Finally, the GPON protocol processing module of the ONT adds required GPON protocol header information to the message from the MAC bridge module and then sends the message to the OLT.

In the embodiment of the present invention, after the second type of the VLAN operation configuration data attributes are configured for the UNI, the ONT processes the downlink message through the following steps:

E1. After the VLAN operation configuration data attributes are configured for the UNI of the ONT, the MAC bridge module receives a downlink message with VLAN Tag via the internal Ethernet port.

E2. The MAC bridge module of the ONT judges whether the downlink VLAN Tagging operation mode is transparent transmission mode (0x00); if the VLAN Tagging operation mode is transparent transmission mode, the MAC bridge module executes step E4 directly; otherwise the MAC bridge module executes step E3.

E3. The MAC bridge module of the ONT processes the downlink message in the reverse direction to the uplink VLAN Tagging operation mode, to restore the original VLAN Tag.

E4. The MAC bridge module of the ONT forwards the message to the user side via the UNI.

The above message processing method of the ONT is applicable to the case of two or fewer VLAN Tag layers; if there are N VLAN Tag layers (N is a positive integer), the uplink message processing method further includes the following steps:

D1. The ONT receives an uplink message via the UNI for which the VLAN operation configuration data attributes have been configured.

D2. The UNI function module of ONT categorizes the receive uplink message into UnTag message, message with one VLAN Tag layer, . . . , or message with N VLAN Tag layers (N is a positive integer).

D3. The UNI function module of the ONT performs VLAN Tagging operation for each type of uplink message in accordance with the VLAN operation configuration data attributes; the VLAN Tagging operation is the operation for the VID and/or operation for the VLAN priority on the specified layer of VLAN Tag; in other words, it is any combination of layer and the VID operation and the VLAN priority operation.

The VLAN operation configuration data attributes include an uplink VLAN Tagging operation mode, an inner layer uplink VLAN Tag TCI value, and an outer layer uplink VLAN Tag TCI value; the uplink VLAN Tagging operation mode includes an uplink VLAN Tagging operation mode for UnTag message, an uplink VLAN Tagging operation mode for message with one VLAN Tag layer, . . . , and an uplink VLAN Tagging operation mode for message with N VLAN Tag layers.

The step D3 further includes step D31:

The UNI function module of ONT processes the UnTag message in accordance with the uplink VLAN Tagging operation mode, the inner layer uplink VLAN Tag TCI value, and the outer layer uplink VLAN Tag TCI value in the VLAN operation configuration data attributes for the UnTag message; The UNI function module processes the message with N VLAN Tag layers in accordance with the uplink VLAN Tagging operation mode for message with N VLAN Tag layers (N is a positive integer) in the VLAN operation configuration data attributes.

The processing of the UnTag message described in step D31 includes: keeping unchanged, adding a VLAN Tag layer, or adding two VLAN Tag layers.

The processing of a message with N VLAN Tag layers described in step D31 includes: keeping unchanged, modifying VLAN Tag, or adding VLAN Tag.

With reference to the technical scheme provided in the third embodiment of the present invention.

The VLAN Tag contents of different messages received by the ONT are different. The ONT can divide the service traffic by the VLAN Tags carried in the received messages, categorized messages with the same VLAN Tag characteristic (e.g., identical TCI value, identical VID value, or identical VLAN priority) into one type of traffic stream, and then perform different operations for different traffic streams; those operations include: modifying TCI, modifying VID, or modifying VLAN priority.

The third VLAN Tagging Operation Configuration Data ME defined with that method is described as follows:

ME: VLAN Tagging Operation Configuration Data.

Data relationship: each instance of VLAN Tagging Operation Configuration Data ME corresponds to a MAC bridge port of ONT; the MAC bridge module configures ME via the MAC bridge port. The attributes of the ME is shown in the following table:

| | |
|---|---|
| ME ID | This attribute provides a unique numbered ID for each instance of the ME; the numbered ID is identical to the ID of MAC bridge port configuration data ME at ANI side or UNI side. (Read only, set during creation) (required) (2 bytes) |
| Maximum size of VLAN Tagging operation table entries | This attribute indicates the maximum number of table entries that can be configured for the "VLAN Tagging Operation Table". (Read only) (required) (2 bytes) |
| VLAN Tagging operation table for received frame | This attribute is used to set or delete the VLAN Tagging operation table. Each records includes 10 fields: outer layer VLAN priority filter value, outer layer VID filter value, inner layer VLAN priority filter value, inner layer VID filter value, Tag removal operation value, outer layer VLAN priority operation value, outer layer VID operation value, inner layer VLAN priority operation value, inner layer VID operation value, and padding fields. Each record (entry) of the table uses 9 bytes. (Readable, writeable, set during creation) (required) (N*9 bytes, N is the number of entries in the "VLAN Tagging Operation Table"). Note: The first 4 bytes of each entry is used as the unique index for the entry. |

-continued

Outer layer VLAN priority filter value (4 bits): it represents the
VLAN priority filter value for filtering or categorizing the
received frame and some special functions, shown as follows
0~7: The lower 3 bits constitute the VALN priority filter value
that is used to filter or categorize the received frame.
8: It indicates the outer layer VLAN priority is not taken into
account when the received frame is filtered or categorized.
14: It indicates the frame will be processed by default based on
this table entry if the filtering condition for the received frame
doesn't present in the table.
15: It indicates to filter or categorize any frame without outer
layer VLAN Tag.
Other values: reserved
Outer layer VID filter value (12 bits): It represents the VID filter
value for filtering or categorizing the received frame and some
special functions, shown as follows:
0~4094: The lower 12 bits constitute the VID filter value that
is used to filter or categorize the received frame.
4095: It indicates the outer layer VID is not taken into account
when the received frame is filtered or categorized.
Inner layer VLAN priority filter value (4 bits): It has similar
meaning as the outer layer VLAN priority filter value.
Inner layer VID filter value (12 bits): it has similar meaning as
the outer layer VID filter value.
Tag removal operation (2 bits): It is used to indicate how to
process the frame that is filtered or categorized by the table entry;
the implication is as follows:
00~10: They indicate to remove the VLAN Tags on layer 0, 1,
and 2 from the frame filtered or categorized by the table entry,
respectively.
11: It indicates to directly discard the frame filtered or
categorized by the table entry and not perform any subsequent
operation.
Outer layer VLAN priority operation value (4 bits): it represents
a given VLAN priority to be inserted into the outer layer VLAN
Tag or some special functions, shown as follows:
0~7: The lower 3 bits represent the VLAN priority value to be
inserted into the outer layer VLAN Tag.
8: Copy the inner layer VLAN priority to the outer layer VLAN
priority of the received frame.
15: no outer layer tag (untag)
Other values: reserved
Outer layer VID operation value (4 bits): it represents a given
VID value to be inserted into the outer layer VLAN Tag or some
special functions, shown as follows:
0~4094: The lower 12 bits represent the VID value to be
inserted into the outer layer VLAN Tag.
4096: Copy the inner layer VID to the outer layer VID of the
received frame.
Other values: reserved
Inner layer VLAN priority operation value (4 bits): it represents
a given VLAN priority to be inserted into the inner layer VLAN
Tag or some special functions, shown as follows:
0~7: The lower 3 bits represent the VLAN priority value to be
inserted into the inner layer VLAN Tag.
8: Copy the outer layer VLAN priority to the inner layer VLAN
priority of the received frame.
15: no inner layer tag (untag)
Other values: reserved
Inner layer VID operation (4 bits): it represents a given VID value
to be inserted into the inner layer VLAN Tag or some special
functions, shown as follows:
0~4094: The lower 12 bits represent the VID value to be
inserted into the inner layer VLAN Tag.
4096: Copy the outer layer VID to the inner layer VID.
Other values: reserved
Padding (4 bits):
When the table is created, 3 table entries must be defined for the
default processing mode for Untag, one VLAN Tag layer, and two
VLAN Tag layers (normal forwarding, i. e., no VLAN Tagging
operation); the 3 table entries are:
15, x, 15, x, (x, x, x ,x, x, x)
15, x, 14, x, (x, x, x ,x, x, x)
14, x, 14, x, (x, x, x ,x, x, x)
(Note: 'x" can be any value, '0' is recommended).

The above table shows an embodiment of the present invention, i.e., the VLAN Tagging operation mode is: first, filter or categorize the received message; next, perform operation for the inner layer VLAN Tag and the outer layer VLAN Tag of the message matching the condition separately according to the processing mode corresponding to the type of the message, and perform operation for VID and VLAN priority of the VLAN Tag on each layer separately. However, the actual implementations are not limited to the scheme shown in above table.

With the technical scheme, it is easy to implement conventional operations for VLAN Tags; furthermore, different types of messages with different VLAN Tag can be processed in different VLAN Tagging operation modes. Therefore, different uplink messages can have different VLAN Tags after they are processed by the ONT through the VLAN Tagging operation; as a result, subsequent network devices can process the uplink messages in diverse ways. For example, Ethernet messages received via the UNI can be processed differently: VLAN Stacking operation for UnTag messages, QinQ operation for messages with one VLAN Tag layer, and no processing for messages with two VLAN Tag layers; for messages with outer layer VLAN Tag TCI value=2, copy the inner layer VLAN Tag TCI value.

In the embodiment of the present invention, the configuration terminal configures the third type of VLAN operation configuration data attributes in the same way as it configures the first type of VLAN operation configuration data attributes, only with the following difference: the third type of VLAN operation configuration data attributes include a VLAN Tagging operation table for the received frame.

In the embodiment of the present invention, the ONT controls the VLAN Tags mainly by filtering or categorizing the received frame according to one or more of protocol fields in VLAN Tag. The ONT performs one or more operations (keep unchanged, delete, add, modify, or copy) for one or more protocol fields in VLAN Tag of each type of frame obtained by filtration or categorization. The protocol fields include VLAN priority and VID fields; they may belong to inner layer VLAN Tag and/or outer layer VLAN Tag.

In the embodiment of the present invention, the ONT performs the VLAN Tagging operation through the following steps:

Define the VLAN Tagging operation for the received frame with the VLAN Tagging operation table including multiple table entries or records; each table entry or record includes:

a group of protocol fields, designed to filter or categorize the received frame to a specific frame group;

a group of control fields, designed to set the processing mode for each type of frame group.

The VLAN Tagging operation table can be applied directly in the uplink direction of ONT.

The protocol fields include filter and control values; the filter value is designed to compare with the received frame to filter or categorize the received frame; the control value is designed to define the selective action for the received frame.

The control field includes a processing value and a control value; the processing value is inserted into the frame to be processed; the control value defines the processing operation for the received frame.

The ONT in the present invention includes a PON protocol processing module and a MAC bridge module that are connected via the internal interface; the ONT has VLAN Tagging operation function, designed to perform operation for the received frame in accordance with the VLAN Tag of the received frame. The VLAN Tagging operation function is configured by the VLAN operation management data ME; the VLAN operation management data ME includes attributes of a VLAN Tagging operation table; the attributes of VLAN Tagging operation table are designed to add or delete table entries or records in the VLAN Tagging operation table. The VLAN Tagging operation function performs operation for the received frame that meets the condition defined by some specific table entry or record in the VLAN Tagging operation table according to the operation mode defined by the table entry or record.

The table entry or record in the VLAN Tagging operation table includes:

a group of filter or categorizing value fields, including filter or categorizing value for the outer layer VLAN priority, a filter or categorizing value for the outer layer VID, filter or categorizing value for the inner layer VLAN priority, and a filter or categorizing value for the inner layer VID, designed to choose one or more of the filter or categorizing value fields to filter or categorize the received frame;

a group of operation value fields, including an outer layer VLAN priority operation value, an outer layer VID operation value, an inner layer VLAN priority operation value, and an inner layer VID operation value, designed to choose one or more operation values to process the received frame.

In conclusion, it can be seen from several embodiments of the present invention, that both the second embodiment and the third embodiment perform corresponding VLAN Tagging operation in accordance with the characteristic value carried in the uplink message. Specifically, in the second embodiment, the characteristic value corresponds to the layer of the VLAN Tag of the uplink message, e.g., o layer (no VLAN Tag in the received uplink message), one layer, or two layers, etc.; in the third embodiment, the characteristic value corresponds to the VLAN priority value or the VID value of the VLAN Tag of the received uplink message. After the VLAN Tagging operation is performed in accordance with the characteristic value of the uplink message, at least two types of uplink messages with different characteristic values have different VLAN Tags after they are processed by the ONT through the VLAN Tagging operation. Therefore, the subsequent network devices interconnected with the ONT can process the uplink messages in diverse ways accordingly.

Furthermore, the VLAN Tagging operations can not only be performed entirely based on TCI value in a conventional manner but also be further refined, so that any combination of refined basic operations can be used to implement diverse VLAN Tagging operations. The so-called refined VLAN Tagging operations refer to the VID operation and the VLAN priority operation, the refined VLAN Tagging operations are further combined with layer-based operation, i.e., operation for VID on the specified layer of VLAN Tag and/or operation for VLAN priority on the specified layer, so as to implement diverse operations by means of combination. Therefore, the present invention can implement diverse VLAN Tagging operations simply and easily in different scenarios requiring VLAN Tagging operations.

It can be seen that the technical scheme provided in the embodiments of the present invention not only provides the premise for diverse processing operations of subsequent network devices interconnected with the ONT but also simplifies VLAN Tagging operations, and can extend VLAN Tagging operation modes flexibly, thereby easily implementing diverse VLAN Tagging operations and reducing the PON deployment cost. Furthermore, it is noted that though the embodiments are described in the examples of operations for two VLAN Tag layers, those skilled in the art should be aware that the technical scheme provided in the present invention can be expanded to process messages with more VLAN Tag layers based on the same concept.

Figure 10:
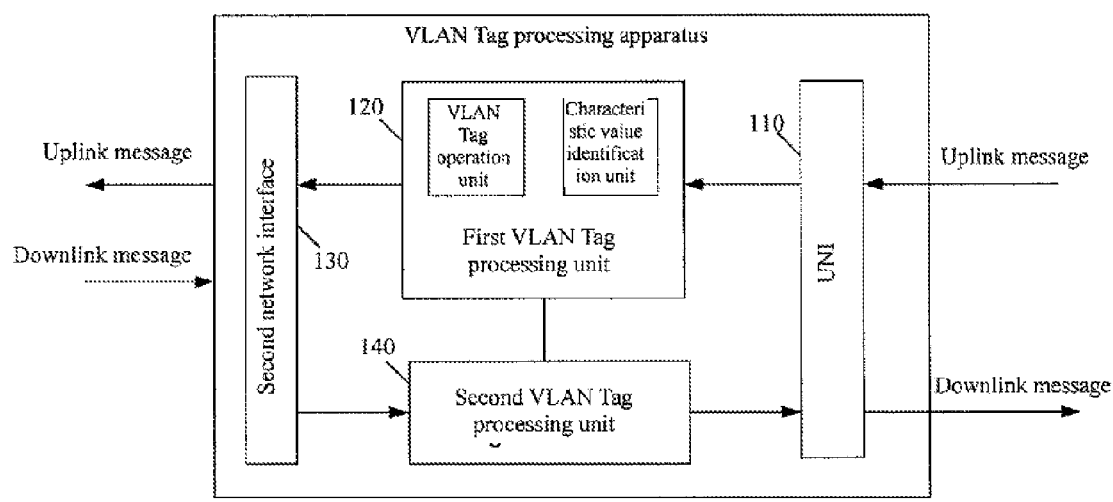
FIG. 10 is a structural representation of the embodiment of VLAN Tag processing apparatus in the present invention.

With reference to FIG. 10, a structural representation of the embodiment of VLAN Tag processing apparatus is provided in the present invention. The apparatus includes user network interface (UNI) 110, a first VLAN Tag processing unit 120, a second VLAN Tag processing unit 140, and a second network interface 130. The apparatus can be built in the MAC bridge module in the ONT; in that case, the second network interface 130 is the internal Ethernet interface between the GPON protocol processing module and the MAC bridge module in the ONT. Hereunder the components of the apparatus will be further described, with reference to the working principle of the apparatus.

First, after the apparatus receives an uplink message via the UNI 110, the apparatus performs the corresponding VLAN Tagging operation via the first VLAN Tag processing unit 120 in accordance with the characteristic value of the received uplink message; as a result, at least two types of uplink messages with different characteristic values have different VLAN Tags after they are processed by the first VLAN Tag processing unit 120 through the VLAN Tagging operation. Specifically, the first VLAN Tag processing unit includes a characteristic value identification unit and a VLAN Tag operation unit. The characteristic value identification unit is designed to identify the characteristic value of the received uplink message; the VLAN Tag operation unit is designed to perform corresponding VLAN Tagging operation for the uplink message in accordance with the characteristic value identified by the characteristic value identification unit; as a result, at least two types of uplink messages with different characteristic values have different VLAN Tags after they are processed by the VLAN Tag operation unit through the VLAN Tagging operation.

The characteristic value identification unit can be implemented in diverse ways; for example, the characteristic value identification unit can be a tag layer identification unit designed to identify the number of VLAN Tag layers of the received uplink message; or, it can be a VID value identification unit designed to identify the VID on a specified layer of the VLAN Tag in the received uplink message; or, it can be a VLAN priority value identification unit designed to identify the VLAN priority on a specified layer of the VLAN Tag in the received uplink message. Practically, the characteristic value identification unit can include one or more of the above three identification units.

The VLAN Tag operation unit includes VID operation unit and VLAN priority operation unit; the VID operation unit is designed to perform the corresponding VID operation for the uplink message on the specified layer on the basis of the characteristic value identified by the characteristic value identification unit; the VLAN priority operation unit is designed to perform the corresponding VLAN priority operation for the uplink message on the specified layer on the basis of the characteristic value identified by the characteristic value identification unit. First, the VID operation unit includes a first unchanging operation sub-unit, a first modifying operation sub-unit, and a first adding operation sub-unit; the first unchanging operation sub-unit is designed to keep the VID value of the layer in the uplink message on specified layer unchanged; the first modifying operation sub-unit is designed to modify the existing VID value of the layer in the uplink message on the specified layer; the first adding operation sub-unit is designed to add VID value of the layer to the uplink message on the specified layer; the VLAN priority operation unit includes a first unchanging operation sub-unit, a first modifying operation sub-unit, and a first adding operation sub-unit; the first unchanging operation sub-unit keeps the VLAN priority value of the layer in the uplink message on the specified layer unchanged; the first modifying operation sub-unit is designed to modify the existing VLAN priority value of the layer in the uplink message; the first adding operation sub-unit is designed to add VLAN priority value of the layer for the uplink message on the specified layer.

Those skilled in the art should know that for a network device, the VLAN Tagging operation for uplink message and the VLAN Tagging operation for downlink message are reverse to each other. Therefore, after the apparatus in the embodiment receives a downlink message via the second network interface 130, the apparatus performs the operation via the second VLAN Tag processing unit 140 for the downlink message in the reverse direction to the operation performed by the first VLAN Tag processing unit 120.

The present invention also discloses an embodiment of passive optical network system; in the embodiment, the passive optical network system includes an optical line terminal (OLT), an optical network termination (ONT), and an optical distribution network that is used to transmit messages between the OLT and the ONT; the ONT includes the VLAN Tag processing apparatus shown in FIG. 10. Since the ONT in the embodiment can provide different VLAN Tags to the uplink messages from user side, after uplink messages are processed by ONT through the VLAN Tagging operation and then transmitted through the optical distribution network to a optical network terminal, the optical network terminal can process the message differently in accordance with respective VLAN Tags (e.g., VLAN Tag on the outermost layer) of the messages, so as to meet the demand for diversified processing.

While the present invention has been illustrated and described with reference to some preferred embodiments, the present invention is not limited to these. Those skilled in the art should recognize that various variations, equivalent replacements, and modifications can be made without departing from the spirit and scope of the present invention as defined by the accompanying claims.

What is claimed is:

1. A method for message processing in an optical network termination (ONT), the method comprising:
receiving, by the ONT, an uplink frame, wherein the ONT comprises a virtual local area network (VLAN) tagging operation configuration data managed entity (ME) with a VLAN tagging operation table, each entry of the VLAN tagging operation table comprises a group of operation value fields and a group of filter value fields including an outer layer VLAN priority filter value, an outer layer VLAN identifier (VID) filter value, an inner layer VLAN priority filter value and an inner layer VID filter value,
wherein the outer layer VLAN priority filter value is between 0 and 7, the outer layer VID filter value is between 0 and 4094, the inner layer VLAN priority filter value is between 0 and 7, the inner layer VID filter value is between 0 and 4094, and
wherein the operation value fields comprises an inner layer VID operation value and an outer layer VID operation value, the inner layer VID operation value being 4096 indicates to copy an outer layer VID to an inner layer VID of an received uplink frame, and the outer layer VID operation value being 4096 indicates to copy the inner layer VID to the outer layer VID of the received uplink frame;

filtering, by the ONT, the received uplink frame according to a characteristic value of the received uplink frame by the use of at least one of the outer layer VLAN priority filter value, the outer layer VID filter value, the inner layer VLAN priority filter value or the inner layer VID filter value in an entry of the VLAN tagging operation table; and performing, by the ONT, a VLAN tagging operation for the filtered uplink frame by use of the operation value fields in the entry of the VLAN tagging operation table.

2. The method according to claim 1, wherein the characteristic value of the received uplink frame comprises at least one of an outer layer VLAN priority, an outer layer VLAN Identifier, VID, an inner layer VLAN priority and an inner layer VID of the received uplink frame.

3. The method according to claim 1, wherein the VLAN tagging operation comprises an operation for VID and/or operation for VLAN priority in the VLAN tag of the uplink frame on a specified layer.

4. The method according to claim 1, wherein the VLAN tagging operation comprises at least one of adding an outer layer VLAN priority tag for a received uplink frame, not adding an outer layer VLAN priority tag, adding an outer layer VID tag for a received uplink frame, not adding an outer layer VID tag.

5. The method according to claim 1, wherein the VLAN tagging operation configuration data ME is configured in the ONT device by the OLT through an ONT Management and Control Interface (OMCI) message.

6. The method according to claim 1, wherein the inner layer VID operation value being a value in 0~4094 indicates to use the value as the inner layer VID of the received uplink frame, and the outer layer VID operation value being a value in 0~4094 indicates to use the value as the outer layer VID of the received uplink frame.

7. An optical network termination (ONT) for performing a virtual local area network (VLAN) tagging operation, the ONT comprising:

a memory configured to store a VLAN tagging operation configuration data management entity (ME) configured by an optical line terminal (OLT), wherein the VLAN tagging operation configuration data ME includes an VLAN tagging operation table, each entry of the VLAN tagging operation table comprises a group of operation value fields and a group of filter value fields including an outer layer VLAN priority filter value, an outer layer VID filter value, and wherein an inner layer VLAN priority filter value and an inner layer VID filter value, and wherein the outer layer VLAN priority filter value is between 0 and 7, the outer layer VID filter value is between 0 and 4094, the inner layer VLAN priority filter value is between 0 and 7, the inner layer VID filter value is between 0 and 4094, and wherein the operation value fields comprises an inner layer VID operation value and an outer layer VID operation value, the inner layer VID operation value being 4096 indicates to copy an outer layer VID to an inner layer VID of an received uplink frame, and the outer layer VID operation value being 4096 indicates to copy the inner layer VID to the outer layer VID of the received uplink frame;

a first network interface configured to receive an upstream uplink frame, which includes a Tag Control Information (TCI) field with at least one of an outer layer VLAN priority filter value, an outer layer VID filter value, an inner layer VLAN priority filter value or an inner layer VID filter value; and a medium access control (MAC) bridge device configured to implement operations comprising:

a) filtering the received uplink frame according to a characteristic value of the received uplink frame by the use of at least one of the outer layer VLAN priority filter value, the outer layer VID filter value, the inner layer VLAN priority filter value and the inner layer VID filter value in a corresponding entry of the VLAN tagging operation table; and b) performing a VLAN tagging operation for the filtered uplink frame by use of the operation value fields in the corresponding entry of the VLAN tagging operation table.

8. The ONT according to claim 7, wherein the characteristic value of the received uplink frame comprises at least one of an outer layer VLAN priority, an outer layer VLAN Identifier, VID, an inner layer VLAN priority and an inner layer VID of the received uplink frame.

9. The ONT according to claim 7, wherein the VLAN tagging operation comprises an operation for at least one of VID and VLAN priority in the VLAN tag of the uplink frame on a specified layer.

10. The ONT according to claim 7, wherein the VLAN tagging operation comprises at least one of adding an outer layer VLAN priority tag for a received uplink frame, not adding an outer layer VLAN priority tag, adding an outer layer VID tag for a received uplink frame, not adding an outer layer VID tag.

11. The ONT according to claim 7, wherein the VLAN tagging operation configuration data ME is configured in the ONT device by the OLT through an ONT Management and Control Interface (OMCI) message.

12. The ONT according to claim 7, wherein the inner layer VID operation value being a value in 0~4094 indicates to use the value as the inner layer VID of the received uplink frame, and the outer layer VID operation value being a value in 0~4094 indicates to use the value as the outer layer VID of the received uplink frame.

13. An apparatus in an optical network termination (ONT) for performing a virtual local area network (VLAN) tagging operation, the apparatus comprising:

a memory configured to store a VLAN tagging operation configuration data management entity (ME) configured by an optical line terminal (OLT), wherein the VLAN tagging operation configuration data ME includes an VLAN tagging operation table, each entry of the VLAN tagging operation table comprises a group of operation value fields and a group of filter value fields including an outer layer VLAN priority filter value, an outer layer VID filter value, an inner layer VLAN priority filter value and an inner layer VID filter value, and wherein the outer layer VLAN priority filter value is between 0 and 7, the outer layer VID filter value is between 0 and 4094, the inner layer VLAN priority filter value is between 0 and 7, the inner layer VID filter value is between 0 and 4094, and wherein the operation value fields comprises an inner layer VID operation value and an outer layer VID operation value, the inner layer VID operation value being 4096 indicates to copy an outer layer VID to an inner layer VID of an received uplink frame, and the outer layer VID operation value being 4096 indicates to copy the inner layer VID to the outer layer VID of the received uplink frame;

a first network interface configured to receive an uplink frame, which includes a Tag Control Information (TCI) field with at least one of an outer layer VLAN priority filter value, an outer layer VID filter value, an inner layer VLAN priority filter value or an inner layer VID filter value; and a medium access control (MAC) bridge device configured to implement operations comprising:
   a) filtering the received uplink frame according to a characteristic value of the received uplink frame by the use of at least one of the outer layer VLAN priority filter value, the outer layer VID filter value, the inner layer VLAN priority filter value and the inner layer VID filter value in a corresponding entry of the VLAN tagging operation table; and
   b) performing a VLAN tagging operation for the filtered uplink frame by use of the operation value fields in the corresponding entry of the VLAN tagging operation table.

14. The apparatus according to claim 13, wherein the inner layer VID operation value being a value in 0~4094 indicates to use the value as the inner layer VID of the received uplink frame, and the outer layer VID operation value being a value in 0~4094 indicates to use the value as the outer layer VID of the received uplink frame.

* * * * *